US012626873B2

(12) United States Patent
Fujihara et al.

(10) Patent No.: US 12,626,873 B2
(45) Date of Patent: May 12, 2026

(54) TRIGGER SWITCH

(71) Applicant: OMRON Corporation, Kyoto (JP)

(72) Inventors: Takumi Fujihara, Kyoto (JP); Taiki Koyama, Kyoto (JP); Kazushi Maeta, Kyoto (JP); Kohei Sugiyama, Kyoto (JP)

(73) Assignee: OMRON Corporation, Kyoto (JP)

( * ) Notice: Subject to any disclaimer, the term of this patent is extended or adjusted under 35 U.S.C. 154(b) by 226 days.

(21) Appl. No.: 18/395,609

(22) Filed: Dec. 24, 2023

(65) Prior Publication Data

US 2024/0249896 A1 Jul. 25, 2024

(30) Foreign Application Priority Data

Jan. 23, 2023 (JP) ................................ 2023-008341

(51) Int. Cl.
*H01H 13/06* (2006.01)
*H01H 9/08* (2006.01)
(Continued)

(52) U.S. Cl.
CPC .............. *H01H 13/06* (2013.01); *H01H 9/08* (2013.01); *H01H 13/14* (2013.01); *H01H 13/285* (2013.01)

(58) Field of Classification Search
CPC ........... H01H 2003/12; H01H 2013/00; H01H 2013/02; H01H 2013/04; H01H 2013/06; H01H 2013/50; H01H 2013/525; H01H 2223/00; H01H 2223/002; H01H 2223/044; H01H 2231/048; H01H 13/00; H01H 13/04; H01H 13/06; H01H 13/14; H01H 13/18; H01H 13/20; H01H 13/28; H01H 13/50; H01H 9/00; H01H 9/02;
(Continued)

(56) References Cited

U.S. PATENT DOCUMENTS 8,759,696 B2 * 6/2014 Nishikimi ................ H01H 9/06 200/302.2
2016/0365202 A1 * 12/2016 Koyama ................ H01H 13/08

FOREIGN PATENT DOCUMENTS

EP 0271674 6/1988
JP S63124315 5/1988
(Continued)

OTHER PUBLICATIONS

"Notice of Non-Final Rejection of Korea Counterpart Application", with English translation thereof, issued on Jan. 14, 2025, pp. 1-9.
(Continued)

*Primary Examiner* — Anthony R Jimenez
(74) *Attorney, Agent, or Firm* — JCIPRNET

(57) ABSTRACT

A trigger switch includes: a trigger that receives a pushing operation; a shaft member that supports the trigger on one end side thereof; and a housing in which a through hole is opened through which the other end side of the shaft member passes. The shaft member moves inside the housing due to the pushing operation on the trigger. The trigger switch includes a covering member that covers the shaft member in a circumferential direction, has its inside sealed, and is expandable and contractible in an axial direction. The covering member has one end side attached to an outer periphery of the shaft member and has the other end side attached to a periphery of the through hole of the housing.

1 Claim, 6 Drawing Sheets

(51) Int. Cl.
*H01H 13/14* (2006.01)
*H01H 13/28* (2006.01)

(58) Field of Classification Search
CPC ............ H01H 9/08; H01H 9/04; H01H 9/041; H01H 9/0214; H01H 3/12; H01H 3/32
USPC ........................................................ 200/302.2
See application file for complete search history.

(56) References Cited

FOREIGN PATENT DOCUMENTS

| | | |
|---|---|---|
| JP | 3051877 | 9/1998 |
| JP | 201129110 | 2/2011 |
| JP | 2012206248 | 10/2012 |
| JP | 2015153626 | 8/2015 |
| JP | 5898993 | 4/2016 |

OTHER PUBLICATIONS

"Notice of Last Non-Final Rejection of Korea Counterpart Application", issued on Sep. 2, 2025, with English translation thereof, pp. 1-7.

* cited by examiner

TRIGGER SWITCH

CROSS-REFERENCE TO RELATED APPLICATIONS

This application claims the priority benefit of Japan Application No. 2023-008341, filed on Jan. 23, 2023. The entirety of the above-mentioned patent application is hereby incorporated by reference herein and made a part of this specification.

BACKGROUND

Technical Field

The disclosure relates to a trigger switch including a trigger that receives a pushing operation.

Related Art

A trigger switch used in controlling an electric tool includes, for example, a trigger that receives a pushing operation, a shaft member that supports the trigger on one end side thereof, and a housing in which a through hole is opened through which the other end side of the shaft member passes. In the trigger switch configured in this manner, the shaft member moves inside the housing due to the pushing operation on the trigger, and when the pushing operation is canceled, the shaft member returns to its original position. As the shaft member reciprocates, the trigger switch causes a breathing motion in which air pressure inside the housing changes. In the case where foreign matter such as external moisture, dust, or outside air is drawn in by the breathing motion, there is a risk of occurrence of abnormalities such as a failure in the trigger switch.

To improve dustproof and waterproof properties, for example, Patent Document 1 (Japanese Patent No. 5898993) discloses a trigger switch for an electric tool, in which a bellows-shaped external packing is provided whose tip portion is engaged with a trigger and whose base end portion is locked to a case, thereby improving the dustproof and waterproof properties.

However, in the trigger switch for an electric tool disclosed in Patent Document 1, since the external packing is engaged with the trigger, the engaged portion of the packing is hidden behind the trigger after the packing is assembled, thus making it difficult to inspect the engaged state.

SUMMARY

A trigger switch includes: a trigger, receiving a pushing operation; a shaft member, supporting the trigger on one end side thereof; and a housing, in which a through hole is opened through which the other end side of the shaft member passes. The shaft member moves inside the housing due to the pushing operation on the trigger. The trigger switch further includes a covering member that covers the shaft member in a circumferential direction, has its inside sealed, and is expandable and contractible in an axial direction. The covering member has one end side attached to an outer periphery of the shaft member and has the other end side attached to a periphery of the through hole of the housing.

DESCRIPTION OF THE EMBODIMENTS

The disclosure provides a trigger switch in which inspection of an attached state of a covering member is easy.

A trigger switch according to the disclosure includes: a trigger, receiving a pushing operation; a shaft member, supporting the trigger on one end side thereof; and a housing, in which a through hole is opened through which the other end side of the shaft member passes. The shaft member moves inside the housing due to the pushing operation on the trigger. The trigger switch further includes a covering member that covers the shaft member in a circumferential direction, has its inside sealed, and is expandable and contractible in an axial direction. The covering member has one end side attached to an outer periphery of the shaft member and has the other end side attached to a periphery of the through hole of the housing.

In the trigger switch, a fitting part is formed on an outer peripheral surface of the shaft member. The one end side of the covering member is fitted into the fitting part formed on the shaft member.

The trigger switch further includes a return spring that is wound around the shaft member outside the housing and energizes the shaft member in a direction opposite to a pushing direction. The covering member is attached so as to cover the return spring that is wound around the shaft member outside the housing.

In the trigger switch, the trigger is able to be attached to and removed from the one end side of the shaft member.

In the trigger switch according to the disclosure, the covering member for sealing has one end side attached to the outer periphery of the shaft member and has the other end side attached to the periphery of the through hole opened in the housing. Accordingly, the trigger switch according to the disclosure has excellent effects such as enabling easy inspection of an attached state before attachment of the trigger.

Hereinafter, an embodiment of the disclosure will be described with reference to the drawings.

Application Example

A trigger switch described in the present application may be applied in various electric devices including an electric tool which includes a drive part such as a motor, such as an electric drill, an electric screwdriver, an electric wrench, and an electric grinder. In the following embodiment, a trigger switch TS like this is described as an example with reference to the drawings.

Structure Example

Figure 1:
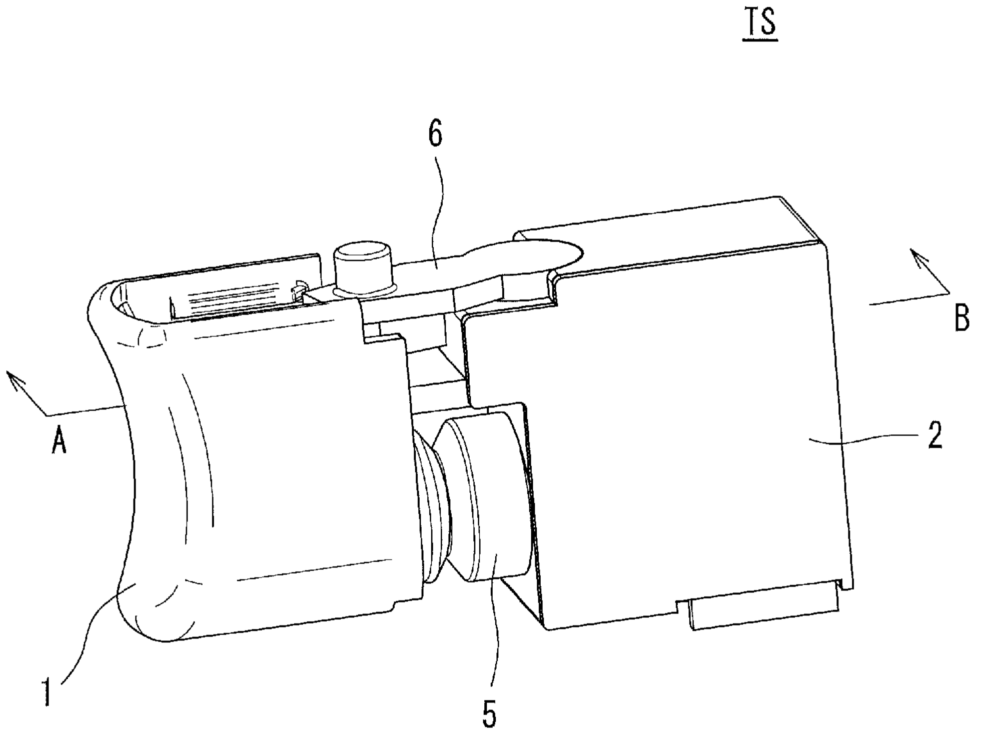
FIG. 1 is a schematic perspective view illustrating an example of an appearance of a trigger switch according to the disclosure.

FIG. 1 is a schematic perspective view illustrating an example of an appearance of the trigger switch TS according to the disclosure. FIG. 1 illustrates the appearance of the trigger switch TS as viewed diagonally from above, in which the trigger switch TS can be incorporated into an electric tool. The trigger switch TS is a switch operated by a user of the electric tool, and includes a trigger 1 on which a pushing operation is performed by the user. Since the user performs the pushing operation of pushing the trigger 1 of the trigger switch TS, a drive part (not illustrated) such as an electric motor built in an electric device is driven. The trigger switch TS includes: a housing 2, incorporated into the electric device; the trigger 1; a shaft member 3 (see FIG. 2 and so on), connecting the trigger 1 and the housing 2; a return spring 4 (see FIG. 2 and so on), energizing the trigger 1; and a covering member 5, covering the shaft member 3. The trigger switch TS includes a switching lever 6 that switches a drive direction of the drive part, for example, between the forward and reverse directions of rotation of an electric screwdriver. In the following description, regarding directions of the trigger switch TS, the side on which the trigger 1 is attached is defined as "front", the housing 2 side is defined as "rear", the switching lever 6 side is defined as "up", and the side opposite to the switching lever 6 is defined as "down". However, these directions are for convenience of description and do not limit the direction in which the trigger switch TS is used.

Figure 2:
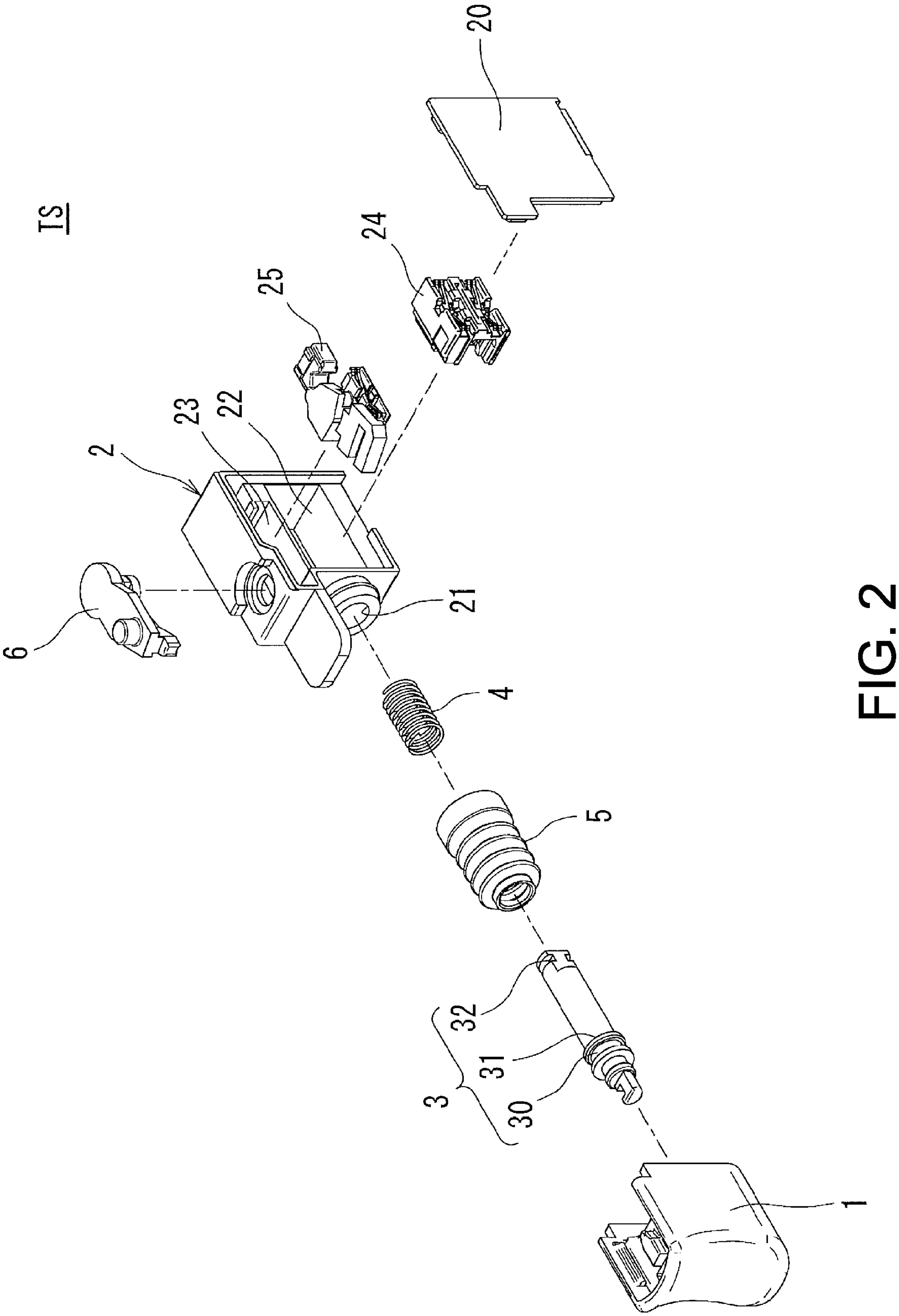
FIG. 2 is a schematic exploded perspective view illustrating an example of the trigger switch according to the disclosure.
Figure 3:
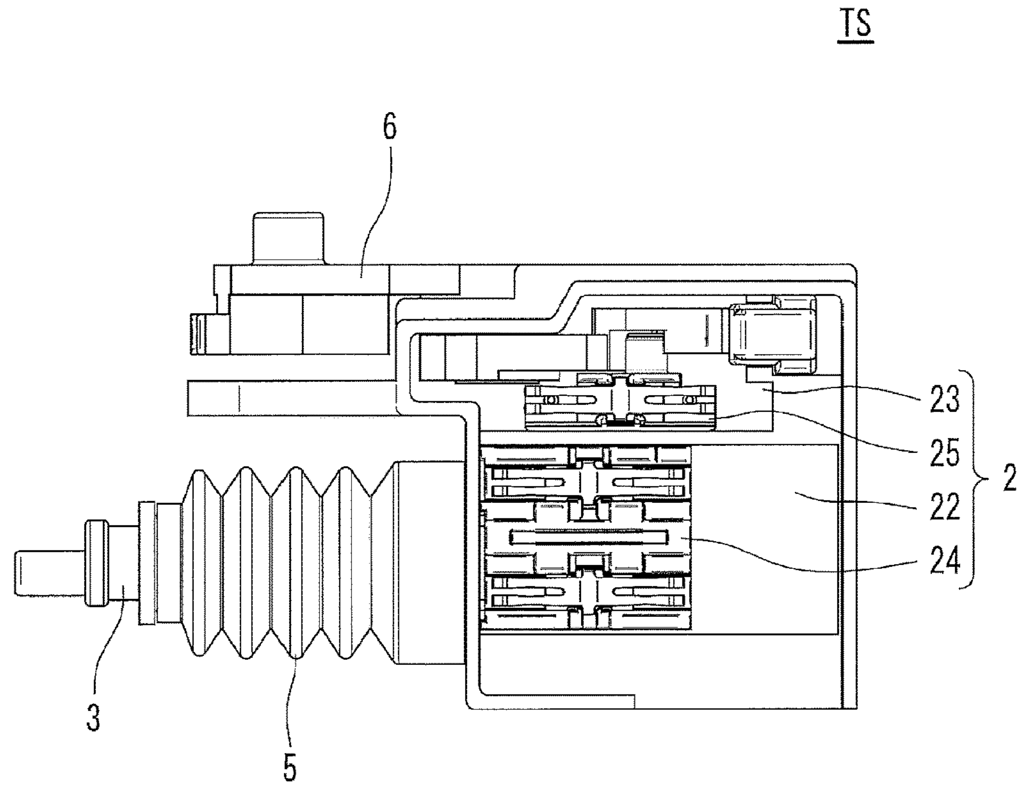
FIG. 3 is a schematic side view illustrating an example of the trigger switch according to the disclosure.
Figure 4:
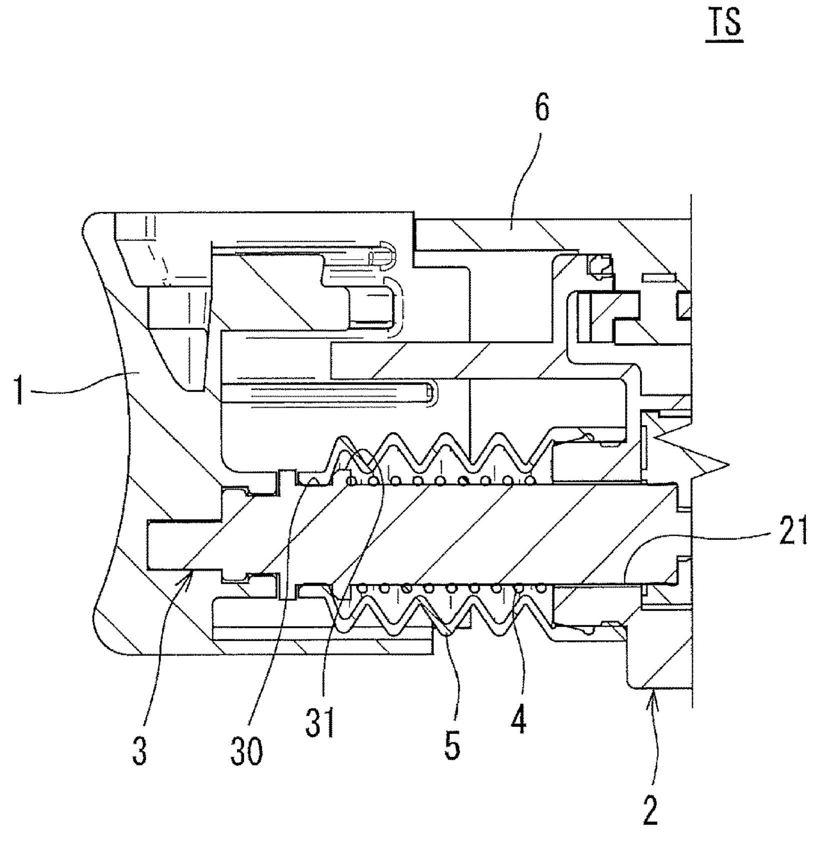
FIG. 4 is a schematic cross-sectional view illustrating an example of a portion of the trigger switch according to the disclosure.

FIG. 2 is a schematic exploded perspective view illustrating an example of the trigger switch TS according to the disclosure. FIG. 3 is a schematic side view illustrating an example of the trigger switch TS according to the disclosure. FIG. 4 is a schematic cross-sectional view illustrating an example of a portion of the trigger switch TS according to the disclosure. FIG. 3 illustrates a state in which the trigger 1 and a portion of the housing 2 have been removed so that the inside of the trigger switch TS can be visually recognized. FIG. 4 is a schematic cross-sectional view illustrating a front portion of the trigger switch TS taken along line A-B illustrated in FIG. 1, as viewed in the direction of the arrow. The trigger switch TS is formed of members such as the trigger 1, the housing 2, the shaft member 3, the return spring 4, the covering member 5, and the switching lever 6.

The trigger 1 is a member that receives the pushing operation by the user. A front surface of the trigger 1 has a shape on which the user rests their finger during operation. The trigger 1 is supported by a front end (one end side) of the shaft member 3 of a rod shape. The trigger 1 is fitted into the front end of the shaft member 3, and can be attached to and removed from the front end of the shaft member 3.

The housing 2 is a hollow case of a substantially rectangular parallelepiped shape, in which one open side surface is closed with a cover 20 of a flat plate shape. A circuit (not illustrated) formed on a substrate is arranged on an inner surface of the cover 20. FIG. 3 illustrates a state in which the cover 20 has been removed. A through hole 21 of a substantially circular shape is opened in a front surface of the housing 2, and a rear end (other end side) of the shaft member 3 passes through the through hole 21. A periphery of the through hole 21 protrudes forward in a cylindrical shape. The switching lever 6 is attached to an upper surface of the housing 2. The inside of the housing 2 is divided into two sections in the up-down direction, namely a lower chamber 22 and an upper chamber 23. Inside the housing 2, the lower chamber 22 accommodates an opening/closing mechanism 24, and the upper chamber 23 accommodates a switching mechanism 25. The opening/closing mechanism 24 is a mechanism that opens and closes the circuit formed on the substrate and controls the drive part. The opening/closing mechanism 24 is attached to the rear end of the shaft member 3 and moves in the front-rear direction as the shaft member 3 moves. By rearward movement of the opening/closing mechanism 24, the drive part operates; by forward return of the opening/closing mechanism 24, the drive part stops. The switching mechanism 25 is a mechanism that switches wiring of the circuit opened and closed by the opening/closing mechanism 24. The switching mechanism 25 is attached to the switching lever 6 and operates as the switching lever 6 swings. By operation of the switching mechanism 25, an operation direction of the drive part is switched.

The shaft member 3 is a plunger of a rod shape. The front end being one end side of the shaft member 3 has the trigger 1 attached thereto, and the rear end being the other end side of the shaft member 3 passes through the through hole 21 opened in the front surface of the housing 2 and extends to the inside of the housing 2. The front end of the shaft member 3 is formed in a D-cut shape obtained by cutting away a substantially circular segment from a circular shape, in order to fit the trigger 1 thereinto in a proper direction. A fitting part 30 into which the covering member 5 is fitted is formed on an outer peripheral surface near the front end of the shaft member 3. The fitting part 30 is formed as a recess sandwiched between annular projections formed at the front and rear. The rear one of the projections that form the fitting part 30 serves as a locking part 31 that locks a front end of the return spring 4. Formed at the rear end of the shaft member 3 is an attachment part 32 to which the opening/closing mechanism 24 accommodated in the housing 2 is attached. The attachment part 32 is carved as a groove that goes around the outer peripheral surface of the shaft member 3. The shaft member 3 moves in the front-rear direction being an axial direction as the trigger 1 moves in the front-rear direction.

The return spring 4 is formed of a spring such as a compression coil spring. The return spring 4 is wound around the shaft member 3 in a circumferential direction outside the housing 2, energizes the shaft member 3 forward in a direction opposite to a pushing direction, and returns the shaft member 3 that has been pushed rearward together with the trigger 1 to a release position at the front. The return spring 4 has the front end locked to the locking part 31 of the shaft member 3, and has the rear end locked to the periphery of the through hole 21 opened in the front surface of the housing 2.

The covering member 5 is formed in a substantially cylindrical bellows shape, and covers the shaft member 3 and the return spring 4 in the circumferential direction outside the housing 2. A front end being one end side of the covering member 5 is attached to while being fitted into the fitting part 30 formed on the outer periphery of the shaft member 3. A rear end being the other end side of the covering member 5 is attached so as to cover a protruding portion of the periphery of the through hole 21 opened in the front surface of the housing 2. The covering member 5 is a packing made of a material having flexibility and sealability, such as rubber, expands and contracts in the axial direction and has its inside sealed.

The switching lever 6 is a member that swings left and right in response to a switching operation from the user to switch the drive direction of the drive part, and transmits the swinging motion to the switching mechanism 25. In the case where the switching lever 6 is operated to be located in the middle of a swing range, the switching lever 6 functions as a stopper that prevents the trigger 1 from being pushed.

The trigger switch TS configured as described above is incorporated into an electric device such as an electric tool, and receives an operation from the user. The user of the electric device performs an operation such as the pushing operation of pushing the trigger 1 and the switching operation of swinging the switching lever 6. The trigger 1 that has received the pushing operation moves rearward. As the trigger 1 moves rearward, the shaft member 3 attached to the trigger 1 moves rearward. As the shaft member 3 moves rearward, the opening/closing mechanism 24 attached to the rear end of the shaft member 3 moves rearward, and the drive part is driven. As the shaft member 3 moves rearward, the return spring 4 and the covering member 5 are compressed in the axial direction.

In the case of stopping the drive part, the user cancels the pushing of the trigger 1. By canceling of the pushing, the return spring 4 energizes the shaft member 3 forward. By energization of the return spring 4, the trigger 1, the shaft member 3, and the opening/closing mechanism 24 move forward and return to the release position. As the shaft member 3 moves forward, the return spring 4 and the covering member 5 are extended in the axial direction.

In the trigger switch TS according to the disclosure, as the shaft member 3 reciprocates forward and rearward, a breathing motion occurs in which the air pressure inside the housing 2 changes. By sealing with the covering member 5, foreign matter such as external moisture, dust, or outside air is prevented from being drawn in. In this way, the trigger switch TS according to the disclosure has a structure having high protection properties such as dustproof and waterproof properties.

Assembly Example

Figure 5:
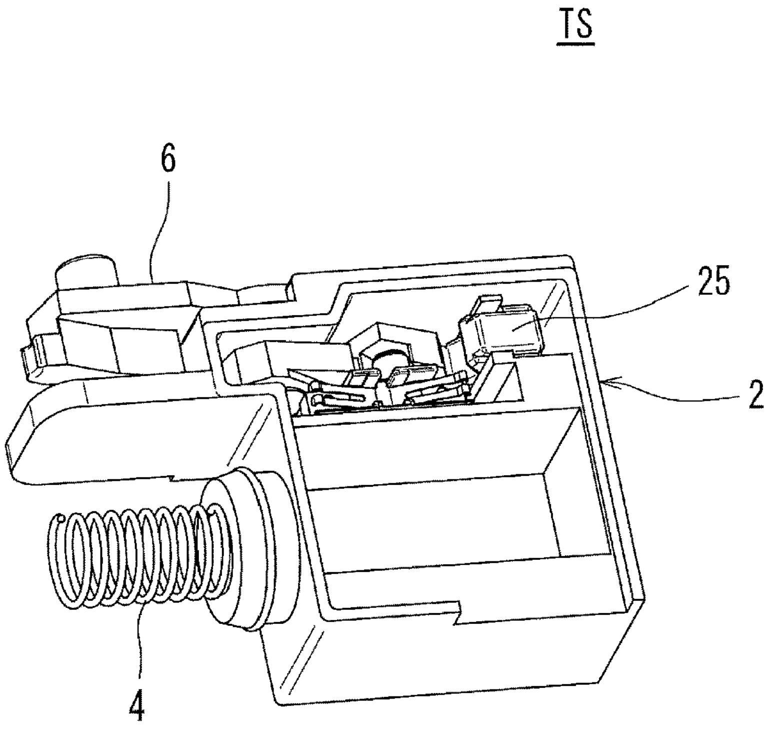
FIG. 5 is a schematic perspective view illustrating an example of an assembly process of the trigger switch according to the disclosure.

Next, an assembly process of the trigger switch TS according to the disclosure will be described. FIG. 5 is a schematic perspective view illustrating an example of the assembly process of the trigger switch TS according to the disclosure. FIG. 5 illustrates a state in which, as the assembly process, the switching mechanism 25 is accommodated in the housing 2 in an open state without the cover 20 attached, the switching lever 6 is attached from the upper surface of the housing 2, and the return spring 4 is attached to the front surface of the housing 2.

Figure 6:
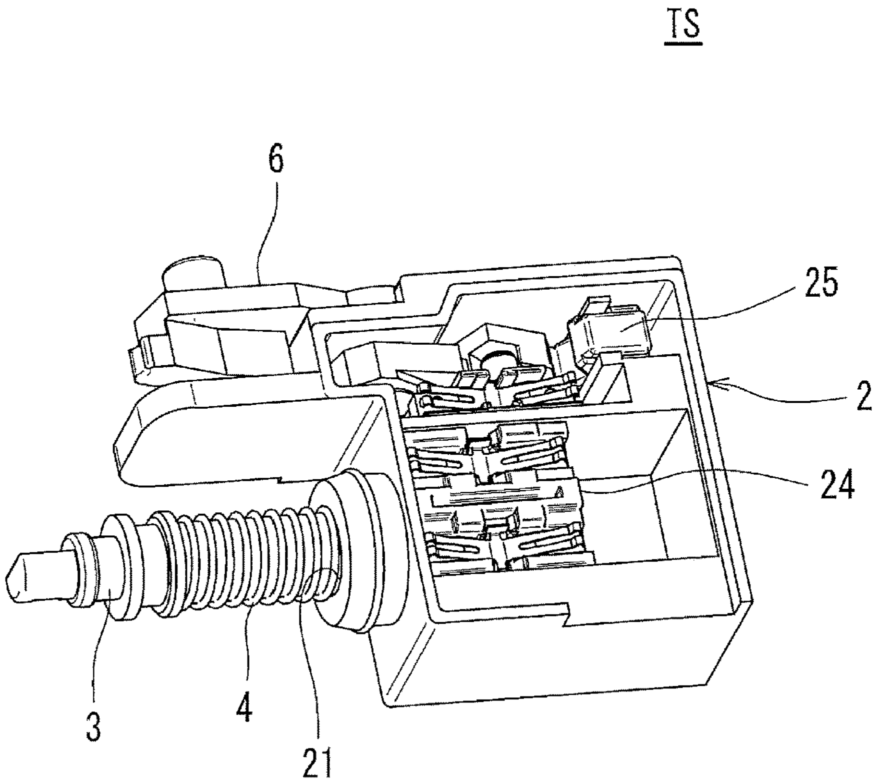
FIG. 6 is a schematic perspective view illustrating an example of the assembly process of the trigger switch according to the disclosure.

FIG. 6 is a schematic perspective view illustrating an example of the assembly process of the trigger switch TS according to the disclosure. FIG. 6 illustrates a state in which, from the state illustrated in FIG. 5, the opening/closing mechanism 24 is accommodated in the housing 2, and the shaft member 3 is passed through and attached to the through hole 21 in the front surface of the housing 2.

Figure 7:
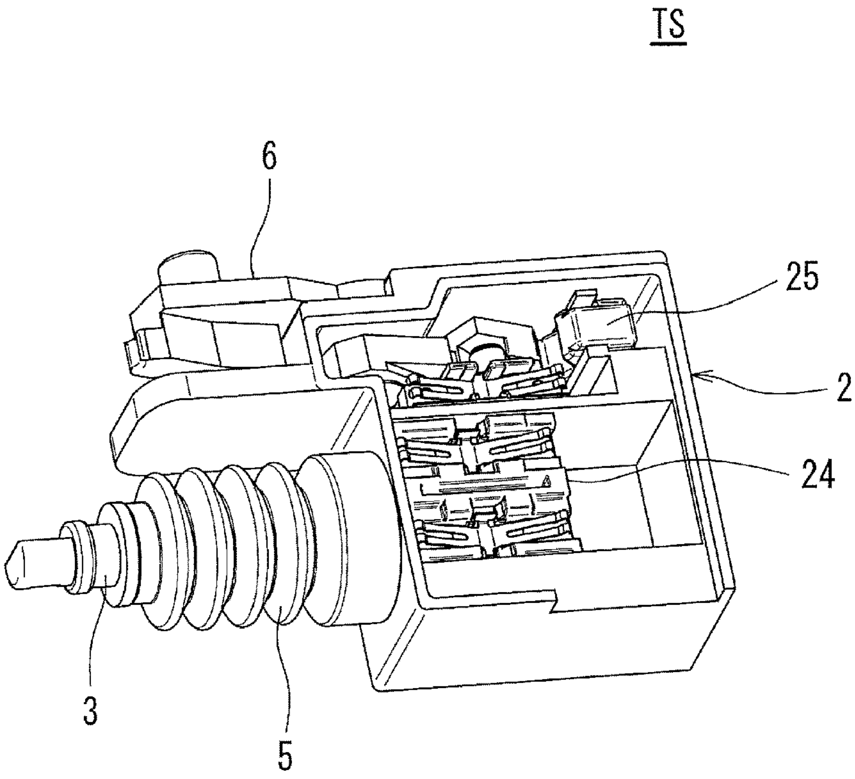
FIG. 7 is a schematic perspective view illustrating an example of the assembly process of the trigger switch according to the disclosure.

FIG. 7 is a schematic perspective view illustrating an example of the assembly process of the trigger switch TS according to the disclosure. FIG. 7 illustrates a state in which, from the state illustrated in FIG. 6, the covering member 5 that covers the shaft member 3 and the return spring 4 in the circumferential direction and has its inside sealed is attached. In the trigger switch TS according to the disclosure, it is possible to inspect the attached state of the covering member 5 and the sealed state when the shaft member 3 is moved in the state illustrated in FIG. 7. Moreover, in the state illustrated in FIG. 7, the covering member 5 itself is exposed without being shielded by any shielding object such as the trigger 1, thus making it possible to improve efficiency and accuracy of the inspection.

Figure 8:
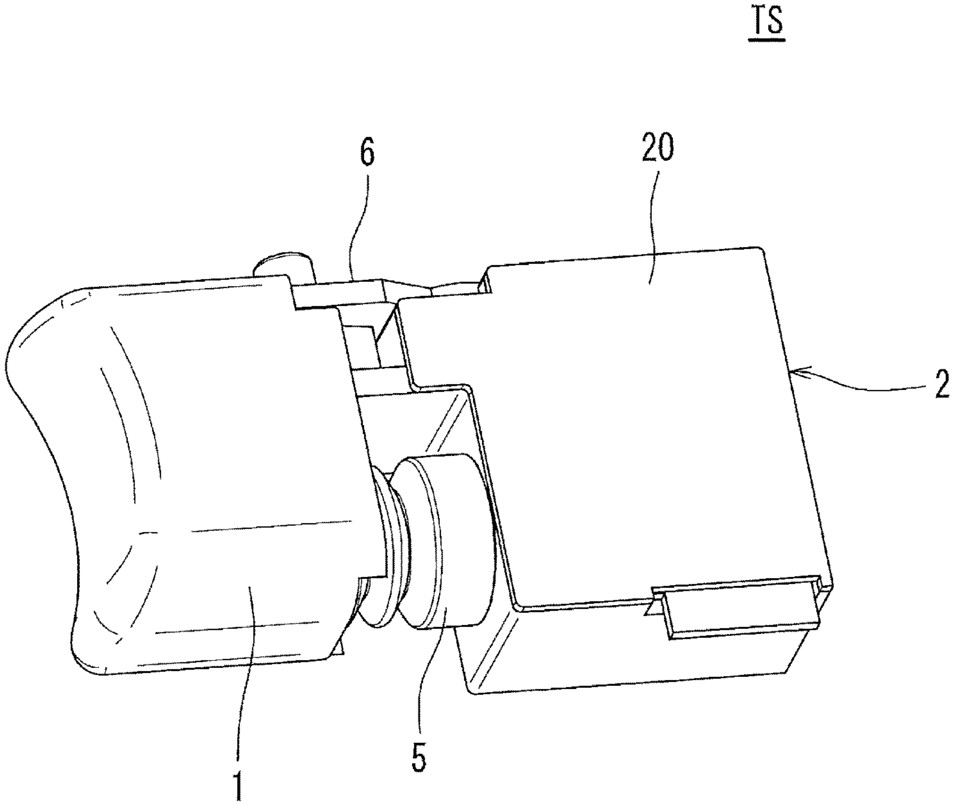
FIG. 8 is a schematic perspective view illustrating an example of the assembly process of the trigger switch according to the disclosure.

FIG. 8 is a schematic perspective view illustrating an example of the assembly process of the trigger switch TS according to the disclosure. FIG. 8 illustrates a state in which, from the state illustrated in FIG. 7, the trigger 1 is attached to the front end of the shaft member 3, the open surface of the housing 2 is closed with the cover 20, and the trigger switch TS is completed. The trigger switch TS is assembled in the above manner.

Trigger Replacement Example

Figure 9:
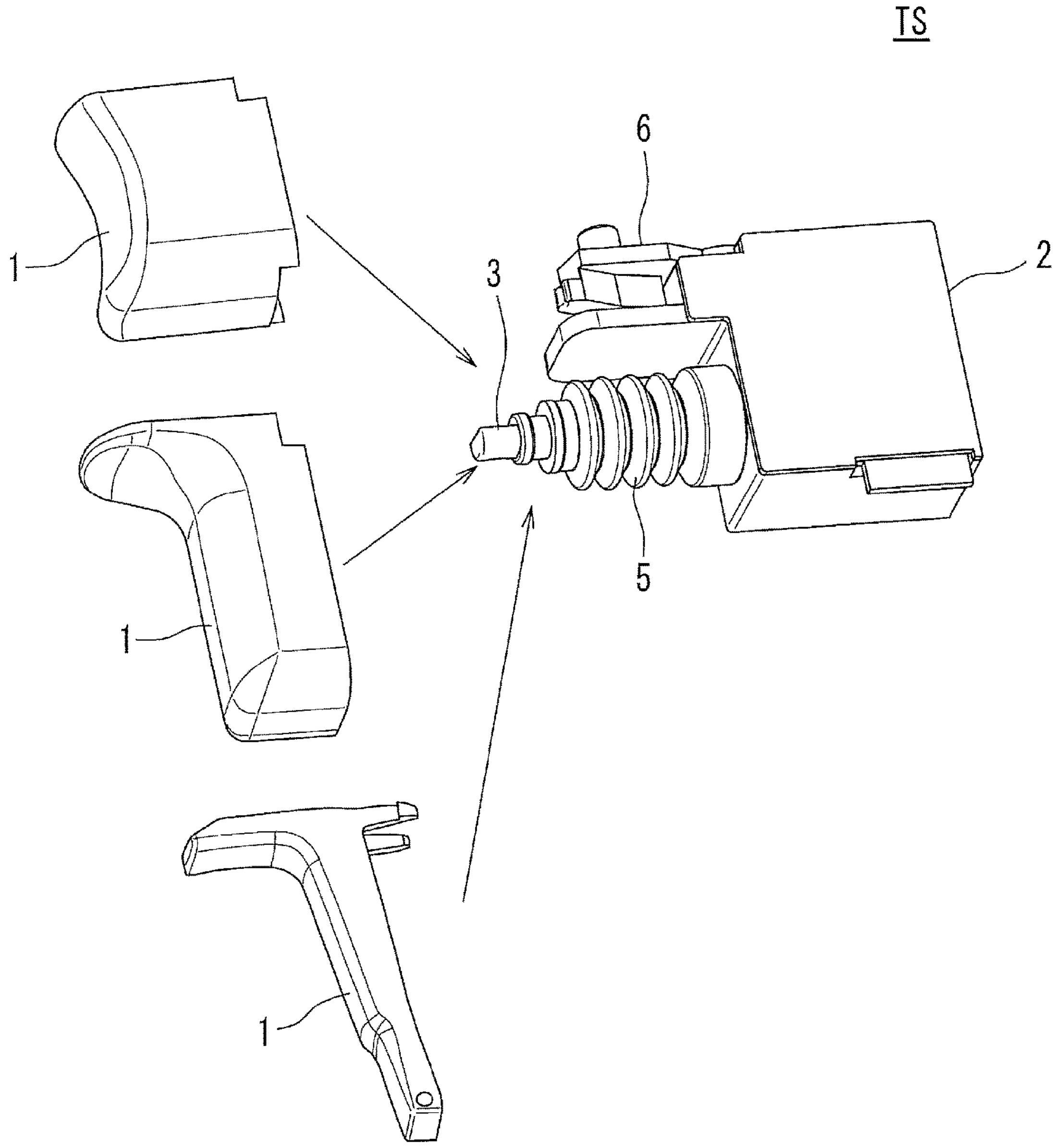
FIG. 9 is an explanatory diagram conceptually illustrating an example of trigger replacement of the trigger switch according to the disclosure.

Next, replacement of the trigger 1 of the trigger switch TS according to the disclosure will be described. FIG. 9 is an explanatory diagram conceptually illustrating an example of replacement of the trigger 1 of the trigger switch TS according to the disclosure. In the trigger switch TS according to the disclosure, the trigger 1 can be attached to and removed from the front end of the shaft member 3. Accordingly, as conceptually illustrated in FIG. 9, the trigger switch TS according to the disclosure can be implemented in a form in which the trigger 1 can be replaced by the user even after the trigger switch TS has been incorporated into an electric device. In the trigger switch TS according to the disclosure, since the front end of the covering member 5 is attached to the shaft member 3 and the rear end of the covering member 5 is attached to the housing 2, excellent effects such as enabling replacement of the trigger 1 can be achieved without impairing sealability.

As described above, in the trigger switch TS according to the disclosure, excellent effects, such as making it possible to improve protection properties such as dustproof and waterproof properties by sealing with the covering member 5, can be achieved.

In the trigger switch TS according to the disclosure, one end side of the covering member 5 is attached to the outer periphery of the shaft member 3, and the other end side of the covering member 5 is attached to the periphery of the through hole 21 opened in the housing 2. Accordingly, when the trigger switch TS according to the disclosure is in a state of being exposed without being shielded by any shielding object such as the trigger 1, the sealability during the breathing motion can be inspected and a portion to which the covering member 5 is attached can be confirmed. Thus, in the trigger switch TS according to the disclosure, excellent effects, such as facilitating the inspection and making it possible to improve inspection efficiency and accuracy, can be achieved.

In the trigger switch TS according to the disclosure, excellent effects such as enabling replacement of the trigger 1 can be achieved without impairing sealability.

Furthermore, in the trigger switch TS according to the disclosure, since the return spring 4 is attached to the outside of the housing 2, excellent effects such as making it possible to downsize the housing 2 can be achieved.

The disclosure is not limited to the embodiment described above and can be implemented in various other forms. Therefore, the embodiment described above is merely illustrative in every respect, and should not be interpreted in a limiting manner. The technical scope of the disclosure is described by the claims, and is not restricted in any way by the main text of the description. Furthermore, all modifications and changes within an equivalent scope of the claims are within the scope of the disclosure.

Supplementary Note 1

A trigger switch includes: a trigger, receiving a pushing operation; a shaft member, supporting the trigger on one end side thereof; and a housing, in which a through hole is opened through which the other end side of the shaft member passes. The shaft member moves inside the housing due to the pushing operation on the trigger. The trigger switch further includes a covering member that covers the shaft member in a circumferential direction, has its inside sealed, and is expandable and contractible in an axial direction. The covering member has one end side attached to an outer periphery of the shaft member and has the other end side attached to a periphery of the through hole of the housing.

Supplementary Note 2

In the trigger switch described in Supplementary Note 1, a fitting part is formed on an outer peripheral surface of the shaft member. The one end side of the covering member is fitted into the fitting part formed on the shaft member.

Supplementary Note 3

The trigger switch described in Supplementary Note 1 or Supplementary Note 2 further includes a return spring that is wound around the shaft member outside the housing and energizes the shaft member in a direction opposite to a pushing direction. The covering member is attached so as to cover the return spring that is wound around the shaft member outside the housing.

Supplementary Note 4

In the trigger switch described in any one of Supplementary Note 1 to Supplementary Note 3, the trigger is able to be attached to and removed from the one end side of the shaft member. Description of Reference Numerals

What is claimed is:

1. A trigger switch, comprising:

a trigger, receiving a pushing operation;

a shaft member, supporting the trigger on one end side thereof;

a housing, in which a through hole is opened through which an other end side of the shaft member passes, in which the shaft member moves inside the housing due to the pushing operation on the trigger; and a return spring, wound around the shaft member outside the housing and energizing the shaft member in a direction opposite to a pushing direction, wherein the trigger switch further comprises a covering member that covers the shaft member in a circumferential direction, has its inside sealed, and is expandable and contractible in an axial direction;

the covering member has one end side attached to an outer periphery of the shaft member and has an other end side attached to a periphery of the through hole of the housing;

the covering member is attached so as to cover the return spring that is wound around the shaft member outside the housing;

a fitting part is formed on an outer peripheral surface of the shaft member;

the one end side of the covering member is fitted into the fitting part formed on the shaft member; and the trigger is able to be attached to and removed from the one end side of the shaft member.

* * * * *